US012275247B2

(12) United States Patent
Masuda et al.

(10) Patent No.: US 12,275,247 B2
(45) Date of Patent: Apr. 15, 2025

(54) LIQUID DISCHARGE HEAD AND LIQUID DISCHARGE APPARATUS

(71) Applicants: Toshiaki Masuda, Kanagawa (JP); Keiji Ueda, Kanagawa (JP); Kaname Morita, Kanagawa (JP); Takahiko Kuroda, Hyogo (JP); Naoko Kitaoka, Kanagawa (JP); Arata Suzuki, Kanagawa (JP)

(72) Inventors: Toshiaki Masuda, Kanagawa (JP); Keiji Ueda, Kanagawa (JP); Kaname Morita, Kanagawa (JP); Takahiko Kuroda, Hyogo (JP); Naoko Kitaoka, Kanagawa (JP); Arata Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 143 days.

(21) Appl. No.: 17/959,301

(22) Filed: Oct. 4, 2022

(65) Prior Publication Data

US 2023/0108462 A1 Apr. 6, 2023

(30) Foreign Application Priority Data

Oct. 6, 2021 (JP) ................................ 2021-164956

(51) Int. Cl.
*B41J 2/165* (2006.01)
*B41J 2/14* (2006.01)

(52) U.S. Cl.
CPC ......... *B41J 2/16535* (2013.01); *B41J 2/1433* (2013.01)

(58) Field of Classification Search
CPC .. B41J 2/16535; B41J 2/1433; B41J 2/16517; B41J 2002/16502; B41J 2/161; B41J 2/1626; B41J 2/1631; B41J 2/1642; B41J 2/16538; B41J 2002/1437;
(Continued)

(56) References Cited

U.S. PATENT DOCUMENTS 6,036,105 A 3/2000 Sanada et al.
6,291,927 B1 * 9/2001 Percin ................. B41J 2/14201 310/330

(Continued)

FOREIGN PATENT DOCUMENTS

JP 11-179902 7/1999
JP 2004-276274 10/2004

(Continued)

OTHER PUBLICATIONS

Extended European Search Report issued Feb. 10, 2023 in European Patent Application No. 22197411.6, 8 pages.

*Primary Examiner* — Lisa Solomon
(74) *Attorney, Agent, or Firm* — XSENSUS LLP

(57) ABSTRACT

A liquid discharge head includes a nozzle member. The nozzle member includes a nozzle, a deformable laminar member, and an electromechanical transducer. The nozzle discharges liquid. The deformable laminar member has an opening forming the nozzle. The electromechanical transducer is disposed around the opening. The nozzle member is warped with respect to a discharge-side plane of the nozzle member in a surrounding area of the nozzle when no voltage is applied to the electromechanical transducer.

4 Claims, 9 Drawing Sheets

(58) Field of Classification Search
CPC .......... B41J 2002/14491; B41J 2/14233; B41J 2202/13; B41J 2202/15; B41J 2202/18
See application file for complete search history.

(56) References Cited

U.S. PATENT DOCUMENTS

| | | | |
|---|---|---|---|
| 7,708,389 B2 * | 5/2010 | Murai .................... B41J 2/1645 347/69 | |
| 2006/0232638 A1 | 10/2006 | Kuroda et al. | |
| 2008/0117262 A1 | 5/2008 | Mori et al. | |
| 2008/0309734 A1 | 12/2008 | Nishimura et al. | |
| 2010/0231632 A1 | 9/2010 | Kobayashi et al. | |
| 2011/0007112 A1 | 1/2011 | Takei et al. | |
| 2011/0056808 A1 | 3/2011 | Satoh et al. | |
| 2011/0298854 A1 | 12/2011 | Sakurada et al. | |
| 2012/0236083 A1 | 9/2012 | Mizukami et al. | |
| 2014/0267506 A1 | 9/2014 | Ohnishi et al. | |
| 2015/0070444 A1 | 3/2015 | Ishimori et al. | |
| 2016/0185110 A1 | 6/2016 | Masuda et al. | |
| 2016/0375686 A1 | 12/2016 | Yokoyama et al. | |
| 2017/0210129 A1 | 7/2017 | Tamai et al. | |
| 2019/0270310 A1 | 9/2019 | Masuda et al. | |
| 2020/0139713 A1 | 5/2020 | Kusunoki | |
| 2020/0269575 A1 | 8/2020 | Kobayashi et al. | |
| 2021/0039393 A1 | 2/2021 | Mizukami et al. | |
| 2021/0162759 A1 | 6/2021 | Miwa et al. | |
| 2021/0252862 A1 | 8/2021 | Masuda | |
| 2022/0032622 A1 | 2/2022 | Kitaoka | |
| 2022/0097373 A1 | 3/2022 | Masuda | |
| 2022/0242123 A1 | 8/2022 | Hirabayashi et al. | |

FOREIGN PATENT DOCUMENTS

| | | |
|---|---|---|
| JP | 2004-276367 | 10/2004 |
| JP | 2004-276544 | 10/2004 |
| JP | 2004-314459 | 11/2004 |
| JP | 2005-289039 | 10/2005 |
| JP | 2006-205744 | 8/2006 |
| JP | 2006-312327 | 11/2006 |
| JP | 2006-312328 | 11/2006 |
| JP | 2006-312329 | 11/2006 |
| JP | 2007-296864 | 11/2007 |
| JP | 2008-211965 | 9/2008 |
| JP | 2010-214851 | 9/2010 |
| JP | 2011-131600 | 7/2011 |
| JP | 2012-096554 | 5/2012 |
| JP | 2013-151092 | 8/2013 |
| JP | 2014-046621 | 3/2014 |
| JP | 2014-058126 | 4/2014 |
| JP | 2014-177099 | 9/2014 |
| JP | 2014-241312 | 12/2014 |
| JP | 2015-016648 | 1/2015 |
| JP | 2019-530601 | 10/2019 |
| WO | WO2018/054917 A1 | 3/2018 |

* cited by examiner

LIQUID DISCHARGE HEAD AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2021-164956, filed on Oct. 6, 2021, in the Japan Patent Office, the entire disclosure of which is hereby incorporated by reference herein.

BACKGROUND

Technical Field

Embodiments of the present disclosure relate to a liquid discharge head and a liquid discharge apparatus that discharges liquid.

Related Art

Some liquid discharge heads include a nozzle member that includes a deformable laminar member having an opening that forms a nozzle to discharge liquid and a flexibly deformable piezoelectric element on the deformable laminar member.

As known in the art, when the liquid is discharged, the piezoelectric element is driven to deform a surrounding area of the opening of the laminar member. Specifically, the piezoelectric element is driven to warp the surrounding area in a liquid discharge direction or in a direction opposite to the liquid discharge direction. Thus, the piezoelectric element is driven to control the liquid discharge direction.

SUMMARY

According to an embodiment of the present disclosure, a novel liquid discharge head includes a nozzle member. The nozzle member includes a nozzle, a deformable laminar member, and an electromechanical transducer. The nozzle discharges liquid. The deformable laminar member has an opening forming the nozzle. The electromechanical transducer is disposed around the opening. The nozzle member is warped with respect to a discharge-side plane of the nozzle member in a surrounding area of the nozzle when no voltage is applied to the electromechanical transducer.

Also described is a novel a liquid discharge apparatus. According to an embodiment of the present disclosure, the liquid discharge apparatus includes the liquid discharge head, a wiper, and a voltage applier. The wiper wipes a discharge face of the liquid discharge head. The voltage applier applies a voltage to the electromechanical transducer of the liquid discharge head to warp the surrounding area of the nozzle in the liquid discharge direction when the wiper wipes the discharge face.

Also described is a liquid discharge apparatus. According to an embodiment of the present disclosure, the liquid discharge apparatus includes the liquid discharge head, a wiper, and a voltage applier. The wiper wipes a discharge face of the liquid discharge head. The voltage applier applies a voltage to the electromechanical transducer of the liquid discharge head to warp the surrounding area of the nozzle in a direction opposite to the liquid discharge direction when the wiper wipes the discharge face.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
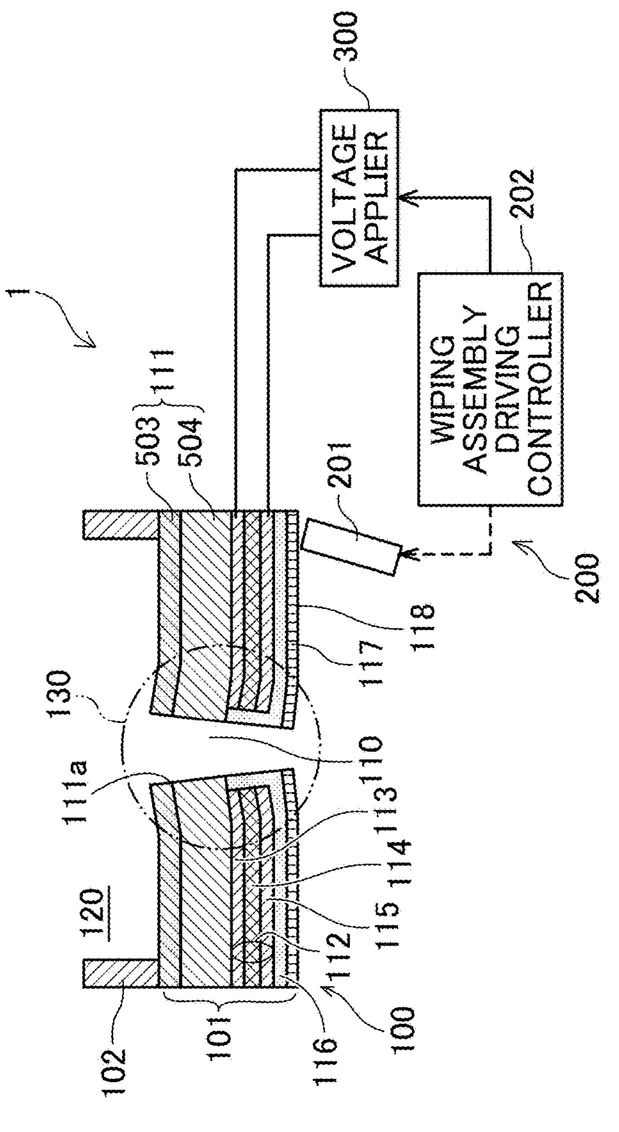
FIG. 1 is a diagram illustrating a liquid discharge apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

Note that, in the following description, suffixes Y, M, C, and K denote colors of yellow, magenta, cyan, and black, respectively. To simplify the description, these suffixes are omitted unless necessary.

As used herein, the term "connected/coupled" includes both direct connections and connections in which there are one or more intermediate connecting elements.

Initially with reference to FIG. 1, a description is given of a first embodiment of the present disclosure.

FIG. 1 is a diagram illustrating a liquid discharge apparatus according to the first embodiment of the present disclosure.

A liquid discharge apparatus 1, as an apparatus that discharges liquid, includes a liquid discharge head 100 according to the present embodiment.

The liquid discharge head 100 includes a nozzle member 101 and a liquid chamber former 102. The nozzle member 101 includes a nozzle 110 that discharges liquid. The liquid chamber former 102 forms a liquid chamber 120 that is communicated with the nozzle 110.

The nozzle member 101 includes a laminar member (or nozzle base) 111 and a piezoelectric element 112. The laminar member 111 serves as a deformable nozzle plate or diaphragm having an opening 111*a* forming the nozzle 110 that discharges the liquid. The piezoelectric element 112 serves as an electromechanical transducer disposed around the opening 111*a* of the laminar member 111.

The laminar member 111 has a layer structure including a vibration layer 504 and an insulation layer 503 having a stress adjusting function.

The piezoelectric element 112 includes a lower electrode 113 on a surface of the vibration layer 504 of the laminar member 111, a piezoelectric film 114 as an electromechanical conversion film on the lower electrode 113, and an upper electrode 115 on the piezoelectric film 114.

A protective film 116 covers the piezoelectric element 112.

A liquid repellent film 117 having liquid repellency is formed on the surface of the protective film 116. A surface of the liquid repellent film 117 serves as a discharge face 118.

The liquid chamber former 102 forms the liquid chamber 120 that is communicated with the nozzle 110, in other words, the opening 111*a* of the laminar member 111, of the nozzle member 101.

In the present embodiment, when no voltage is applied to the piezoelectric element 112 in the liquid discharge head 100, the nozzle member 101 is warped with respect to a discharge-side plane of the nozzle member 101 in a surrounding area 130 of the nozzle 110. In other words, the surrounding area 130 of the nozzle 110 is warped with respect to the main plane of the nozzle member 101 having a larger area than other faces of the nozzle member 101.

In the present embodiment, the surrounding area 130 of the nozzle 110 is an area of a part around the nozzle 110 of a portion of the nozzle member 101 facing the liquid chamber 120. The surrounding area 130 of the nozzle 110 is warped in a direction opposite to a liquid discharge direction. In other words, the surrounding area 130 of the nozzle 110 is warped toward the liquid chamber 120. The warp of the surrounding area 130 of the nozzle 110 in the present embodiment is adjusted with the insulation layer 503 of the laminar member 111 having a stress adjusting function.

The liquid discharge apparatus 1 further includes a maintenance assembly 200 that includes a wiper 201 to wipe the discharge face 118 of the liquid discharge head 100. The wiper 201 is moved by a wiping assembly driving controller 202 relative to the liquid discharge head 100 to wipe and clean the discharge face 118.

The liquid discharge apparatus 1 further includes a voltage applier 300 that applies a voltage to the piezoelectric element 112 of the liquid discharge head 100. The voltage applier 300 applies a given voltage, as a first voltage, to drive the piezoelectric element 112 so as to warp the surrounding area 130 of the nozzle 110 of the nozzle member 101 in the liquid discharge direction.

In the present embodiment, when the wiper 201 performs a wiping operation of wiping the discharge face 118, the voltage applier 300 applies the first voltage to the piezoelectric element 112 corresponding to the nozzle 110 in the surrounding area 130 in which a residual liquid adheres to the discharge face 118.

Referring now to FIGS. 2A to 3B, a description is given of some effects of the present embodiment.

FIGS. 2A to 3B are cross-sectional views of the liquid discharge head 100 and the wiper 201 according to the present embodiment.

The liquid discharge apparatus 1 performs an operation of maintaining and recovering the state of the liquid discharge head 100 with the maintenance assembly 200 at a given point in time. At this time, the wiping assembly driving controller 202 of the maintenance assembly 200 moves the wiper 201 relative to the discharge face 118 of the liquid discharge head 100 to wipe and clean the discharge face 118 of the liquid discharge head 100.

Figure 2A:
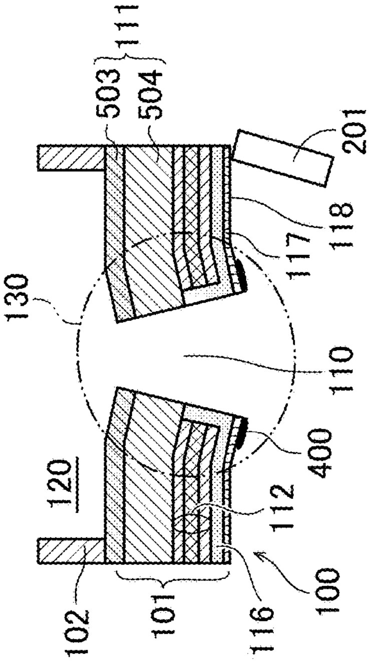
FIGS. 2A and 2B are cross-sectional views of a wiper and a liquid discharge head to which a residual liquid adheres, according to the first embodiment.

In the present embodiment, the voltage applier 300 applies the first voltage to the piezoelectric element 112 corresponding to the nozzle 110 adjacent to the discharge face 118 to which a residual liquid 400 adheres. As a result, as illustrated in FIG. 2A, the surrounding area 130 of the nozzle 110 is displaced such that the surrounding area 130 of the nozzle 110 is warped in the liquid discharge direction.

Figure 2B:
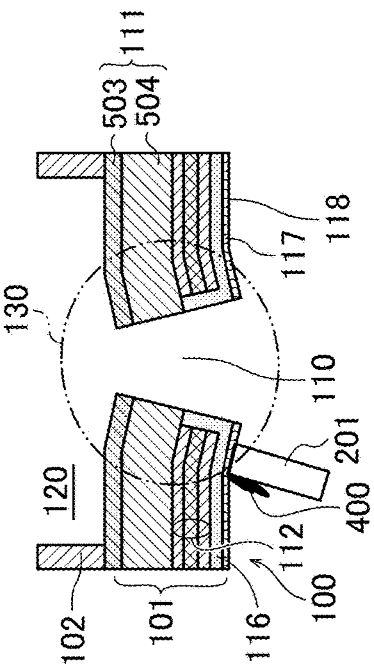

Accordingly, as illustrated in FIG. 2B, since the wiper 201 contacts the discharge face 118 with increased pressure in the surrounding area 130 of the nozzle 110 when the wiper 201 wipes the discharge face 118, the wiper 201 can reliably wipe and remove the residual liquid 400. Thus, the discharge face 118 is cleaned with a small number of times of wiping. In short, the cleaning efficiency is enhanced.

On the other hand, the voltage applier 300 does not apply the first voltage to the piezoelectric element 112 corresponding to the nozzle 110 adjacent to the discharge face 118 to which the residual liquid 400 does not adhere. In other words, as illustrated in FIG. 3A, the surrounding area 130 of the nozzle 110 adjacent to the discharge face 118 to which the residual liquid 400 does not adhere remains warped in the direction opposite to the liquid discharge direction.

Figure 3B:
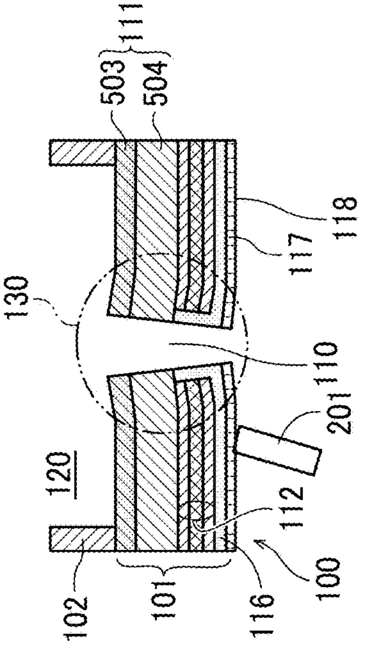
FIGS. 3A and 3B are cross-sectional views of the wiper and the liquid discharge head to which no residual liquid adheres, according to the first embodiment.
Figure 3A:
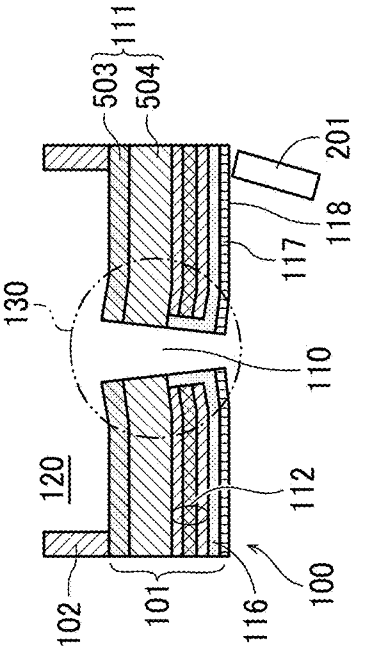

Accordingly, as illustrated in FIG. 3B, when the wiper 201 wipes the discharge face 118, the wiper 201 does not contact the discharge face 118 or contact the discharge face 118 with decreased pressure in the surrounding area 130 of the nozzle 110. This reduces damage to the liquid repellent film 117 caused by the wiping operation.

Figure 4:
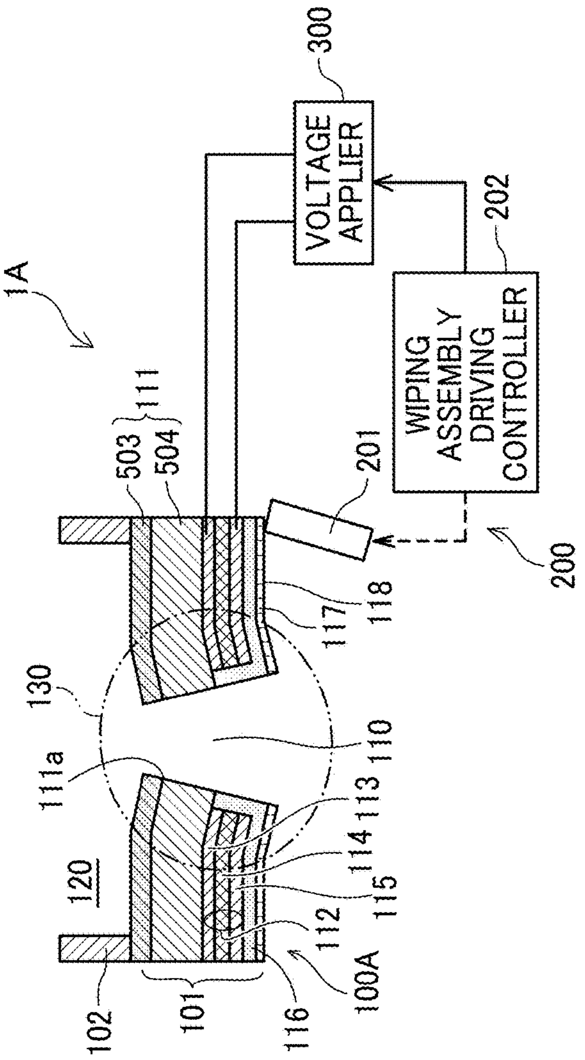
FIG. 4 is a diagram illustrating a liquid discharge apparatus according to a second embodiment of the present disclosure.

Referring now to FIG. 4, a description is given of a second embodiment of the present disclosure.

FIG. 4 is a diagram illustrating a liquid discharge apparatus according to the second embodiment of the present disclosure.

A liquid discharge apparatus 1A, as an apparatus that discharges liquid, includes a liquid discharge head 100A according to the present embodiment.

The liquid discharge head 100A includes the nozzle member 101 and the liquid chamber former 102. The nozzle member 101 includes the nozzle 110 that discharges liquid. The liquid chamber former 102 forms the liquid chamber 120 that is communicated with the nozzle 110.

The nozzle member 101 includes the laminar member (or nozzle base) 111 and the piezoelectric element 112. The laminar member 111 serves as a deformable nozzle plate or diaphragm having the opening 111*a* forming the nozzle 110 that discharges the liquid. The piezoelectric element 112 serves as an electromechanical transducer disposed around the opening 111*a* of the laminar member 111.

The piezoelectric element 112 includes the lower electrode 113 on the surface of the vibration layer 504 of the laminar member 111, the piezoelectric film 114 as an electromechanical conversion film on the lower electrode 113, and the upper electrode 115 on the piezoelectric film 114. The protective film 116 covers the piezoelectric element 112.

The liquid repellent film 117 having liquid repellency is formed on the surface of the protective film 116. The surface of the liquid repellent film 117 serves as the discharge face 118.

The liquid chamber former 102 forms the liquid chamber 120 that is communicated with the nozzle 110, in other words, the opening 111*a* of the laminar member 111, of the nozzle member 101.

In the present embodiment, when no voltage is applied to the piezoelectric element 112 in the liquid discharge head 100A, the nozzle member 101 is warped with respect to the discharge-side plane of the nozzle member 101 in the surrounding area 130 of the nozzle 110. In other words, the surrounding area 130 of the nozzle 110 is warped with respect to the main plane of the nozzle member 101 having a larger area than other faces of the nozzle member 101.

In the present embodiment, the surrounding area 130 of the nozzle 110 is an area of a part around the nozzle 110 of the portion of the nozzle member 101 facing the liquid chamber 120. The surrounding area 130 of the nozzle 110 is warped in the liquid discharge direction. In other words, the surrounding area 130 of the nozzle 110 is warped away from the liquid chamber 120. Like the first embodiment, the warp of the surrounding area 130 of the nozzle 110 in the present embodiment is adjusted with the insulation layer 503 of the laminar member 111 having a stress adjusting function.

The liquid discharge apparatus 1A further includes the maintenance assembly 200 that includes the wiper 201 to wipe the discharge face 118 of the liquid discharge head 100A. The wiper 201 is moved by the wiping assembly driving controller 202 relative to the liquid discharge head 100A to wipe and clean the discharge face 118.

The liquid discharge apparatus 1A further includes the voltage applier 300 that applies a voltage to the piezoelectric element 112 of the liquid discharge head 100A. The voltage applier 300 applies a given voltage, as a second voltage, to drive the piezoelectric element 112 so as to warp the surrounding area 130 of the nozzle 110 of the nozzle member 101 in the direction opposite to the liquid discharge direction, in other words, toward the liquid chamber 120.

In the present embodiment, when the wiper 201 performs the wiping operation, the voltage applier 300 applies the second voltage to the piezoelectric element 112 corresponding to the nozzle 110 in the surrounding area 130 in which no residual liquid adheres to the discharge face 118.

Referring now to FIGS. 5A to 6B, a description is given of some effects of the present embodiment.

FIGS. 5A to 6B are cross-sectional views of the liquid discharge head 100A and the wiper 201 according to the present embodiment.

The liquid discharge apparatus 1A performs the operation of maintaining and recovering the state of the liquid discharge head 100A with the maintenance assembly 200 at a given point in time. At this time, the wiping assembly driving controller 202 of the maintenance assembly 200 moves the wiper 201 relative to the discharge face 118 of the liquid discharge head 100A to wipe and clean the discharge face 118 of the liquid discharge head 100A.

In the present embodiment, the voltage applier 300 does not apply the second voltage to the piezoelectric element 112 corresponding to the nozzle 110 adjacent to the discharge face 118 to which the residual liquid 400 adheres. In other words, as illustrated in FIG. 5A, the surrounding area 130 of the nozzle 110 remains warped in the direction opposite to the liquid discharge direction.

Figure 5B:
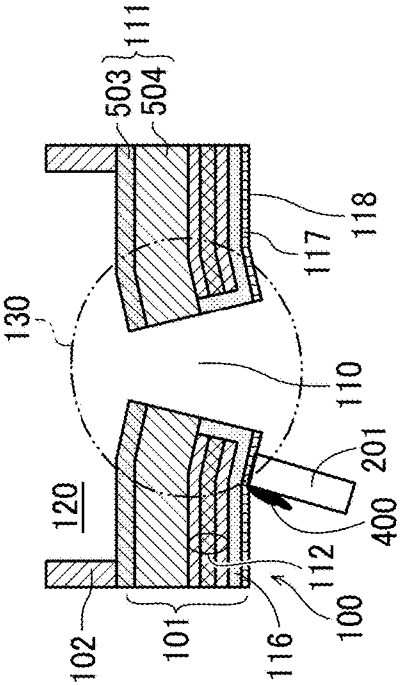
FIGS. 5A and 5B are cross-sectional views of a wiper and a liquid discharge head to which a residual liquid adheres, according to the second embodiment.
Figure 5A:
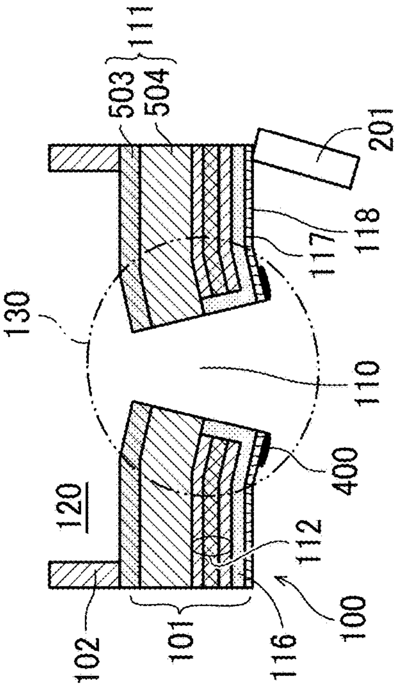

Accordingly, as illustrated in FIG. 5B, since the wiper 201 contacts the discharge face 118 with increased pressure in the surrounding area 130 of the nozzle 110 when the wiper 201 wipes the discharge face 118, the wiper 201 can reliably wipe and remove the residual liquid 400. Thus, the discharge face 118 is cleaned with a small number of times of wiping. In short, the cleaning efficiency is enhanced.

On the other hand, the voltage applier 300 applies the second voltage to the piezoelectric element 112 corresponding to the nozzle 110 adjacent to the discharge face 118 to which the residual liquid 400 does not adhere. As a result, as illustrated in FIG. 6A, the surrounding area 130 of the nozzle 110 adjacent to the discharge face 118 to which the residual liquid 400 does not adhere is displaced such that the surrounding area 130 of the nozzle 110 is warped in the direction opposite to the liquid discharge direction.

Figure 6B:
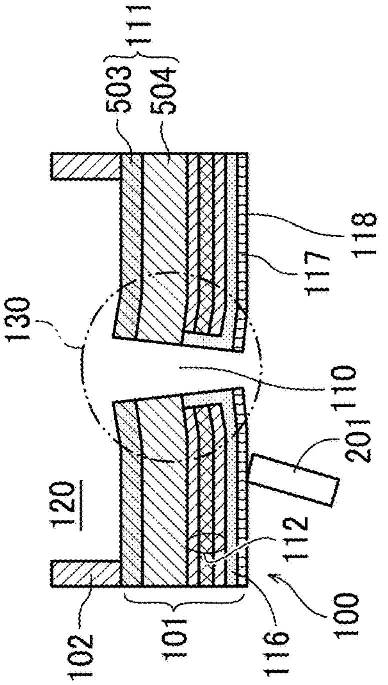
FIGS. 6A and 6B are cross-sectional views of the wiper and the liquid discharge head to which no residual liquid adheres, according to the second embodiment.
Figure 6A:
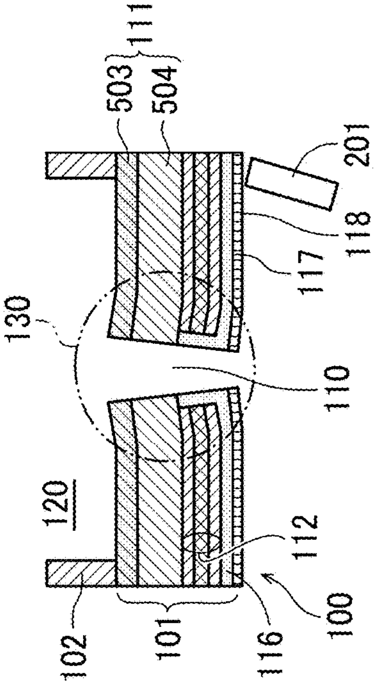

Accordingly, as illustrated in FIG. 6B, when the wiper 201 wipes the discharge face 118, the wiper 201 does not contact the discharge face 118 or contact the discharge face 118 with decreased pressure in the surrounding area 130 of the nozzle 110. This reduces damage to the liquid repellent film 117 caused by the wiping operation.

Figure 7:
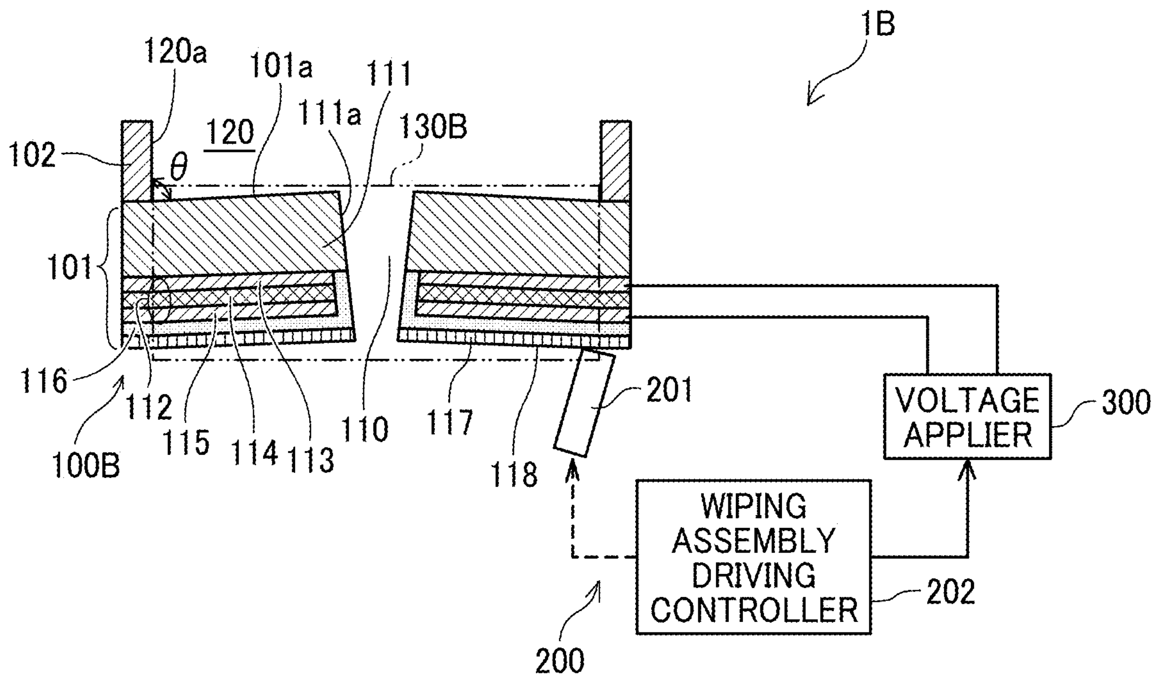
FIG. 7 is a diagram illustrating a liquid discharge apparatus according to a third embodiment of the present disclosure.

Referring now to FIG. 7, a description is given of a third embodiment of the present disclosure.

FIG. 7 is a diagram illustrating a liquid discharge apparatus according to the third embodiment of the present disclosure.

Like the first embodiment described above, when no voltage is applied to the piezoelectric element 112 in a liquid discharge head 100B of a liquid discharge apparatus 1B as an apparatus that discharges liquid according to the present embodiment, the nozzle member 101 is warped with respect to the discharge-side plane of the nozzle member 101 in a surrounding area 130B of the nozzle 110 in the direction opposite to the liquid discharge direction.

In the present embodiment, the surrounding area 130B of the nozzle 110 is the entire area of the portion of the nozzle member 101 facing the liquid chamber 120. As described above, the surrounding area 130B of the nozzle 110 is warped in the direction opposite to the liquid discharge direction. In other words, the surrounding area 130B of the nozzle 110 is warped toward the liquid chamber 120.

Accordingly, a face 101*a* of the nozzle member 101 facing the liquid chamber 120 and a sidewall face 120*a* of the liquid chamber 120 form an angle θ less than 90°. In other words, the nozzle member 101 has the face 101*a* facing the liquid chamber 120, and the face 101*a* is inclined at the angle θ less than 90° with respect to the sidewall face 120*a* of the liquid chamber 120.

As in the embodiments described above, for the nozzle 110 in the surrounding area 130B to which a residual liquid adheres, the surrounding area 130B of the nozzle 110 is warped in the liquid discharge direction when the wiper 201 performs the wiping operation.

Figure 8:
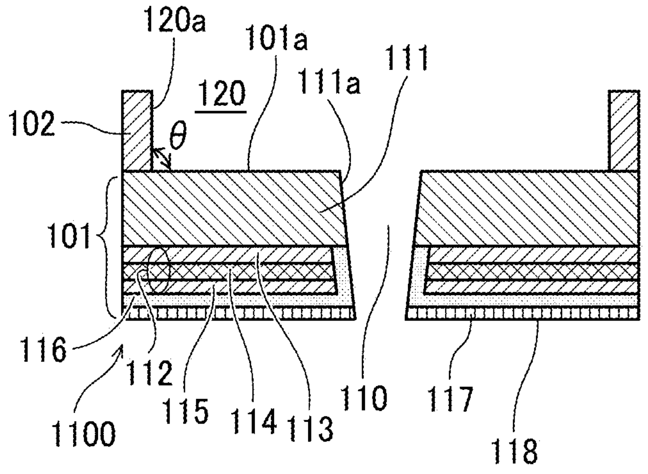
FIG. 8 is a cross-sectional view of a liquid discharge head according to a first comparative example of the third embodiment of the present disclosure.

Referring now to a first comparative example illustrated in FIG. 8, a description is continuously given of some effects of the present embodiment.

In a liquid discharge head 1100 according to the first comparative example, the face 101*a* of the nozzle member 101 facing the liquid chamber 120 and the sidewall face 120*a* of the liquid chamber 120 form an angle θ equal to or greater than 90°.

In a liquid discharge head that includes the piezoelectric element 112 in the surrounding area 130B of the nozzle 110 of the nozzle member 101 to vibrate the nozzle member 101 and perform a liquid discharge operation as in the present embodiment and the first comparative example, the stress is applied to a joint between the nozzle member 101 and the liquid chamber former 102.

In other words, when the liquid discharge head performs the liquid discharge operation, the application of a voltage to the piezoelectric element 112 displaces the surrounding area 130B of the nozzle 110 in a direction in which the angle θ increases at the joint between the face 101*a* of the nozzle member 101 facing the liquid chamber 120 and the sidewall face 120*a* of the liquid chamber 120.

As in the first comparative example illustrated in FIG. 8, when the angle θ is equal to or greater than 90° between the face 101*a* of the nozzle member 101 facing the liquid chamber 120 and the sidewall face 120*a* of the liquid chamber 120, the performance of the liquid discharge operation causes the angle θ to exceed 90°.

When the angle θ thus exceeds 90°, tensile stress is applied to the nozzle member 101 at the joint. The tensile stress repeatedly applied in association with the liquid discharge operation may cause cracks in the laminar member 111 of the nozzle member 101 and shorten the lifespan of the liquid discharge head 1100.

To prevent such a situation, according to the present embodiment, the surrounding area 130B of the nozzle 110 is warped such that the angle θ is less than 90° between the face 101*a* of the nozzle member 101 facing the liquid chamber 120 and the sidewall face 120*a* of the liquid chamber 120. As a result, a decreased tensile stress is applied when the liquid discharge operation is performed. Accordingly, the lifespan of the liquid discharge head is lengthened.

Referring now to FIGS. 9A to 9J, a description is given of a manufacturing process of a liquid discharge head, according to an embodiment of the present disclosure.

FIGS. 9A to 9J are diagrams illustrating a manufacturing process of a liquid discharge head, according to an embodiment of the present disclosure.

Figure 9A:
FIGS. 9A to 9J are diagrams illustrating a manufacturing process of a liquid discharge head, according to an embodiment of the present disclosure.
Figure 9B:
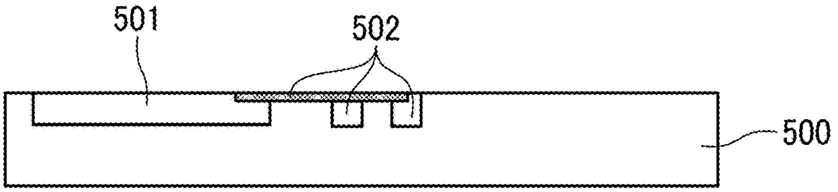

FIG. 9A illustrates a silicon substrate 500, which serves as the liquid chamber former 102. As illustrated in FIG. 9B, the silicon substrate 500 is provided with a drive circuit 501, such as a complementary metal oxide semiconductor (CMOS) circuit that drives the piezoelectric element 112, and an interlayer wiring layer 502 that connects the drive circuit 501 and the piezoelectric element 112 to each other.

Figure 9C:
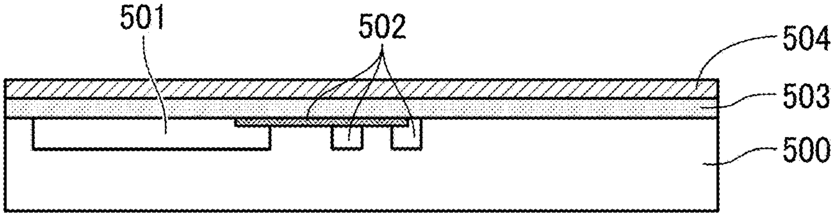

Subsequently, as illustrated in FIG. 9C, the insulation layer 503 is formed to protect the drive circuit 501 and the interlayer wiring layer 502. The vibration layer 504 as a part of the laminar member 111 is formed on the insulation layer 503.

Figure 9D:
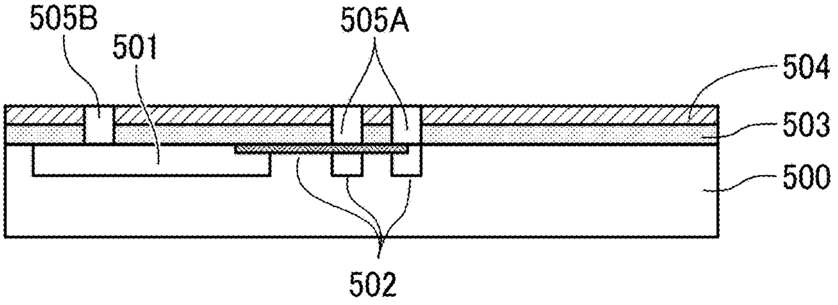

Then, as illustrated in FIG. 9D, a pair of contact portions 505A and a contact portion 505B are formed. The pair of contact portions 505A electrically connects the interlayer wiring layer 502 to the piezoelectric element 112 via the insulation layer 503 and the vibration layer 504. The contact portion 505B is communicated with the drive circuit 501 via the insulation layer 503.

Figure 9E:
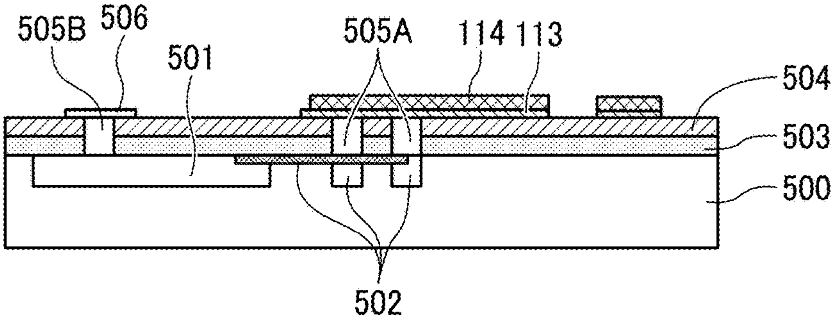

Thereafter, as illustrated in FIG. 9E, an electrode film made of, e.g., platinum (Pt) is formed on the vibration layer 504 so that the photolithography and etching are performed to form the lower electrode 113. An electrode pad 506 of the contact portion 505B is also formed to supply power to the drive circuit 501. After the masking is performed, a film is formed of a piezoelectric material in a chemical vapor deposition (CVD) process or a physical vapor deposition (PVD) process. Thereafter, the mask is removed to form the piezoelectric film 114. As the piezoelectric material, a material such as lead zirconate titanate (PZT) can be selected from various materials.

Figure 9F:
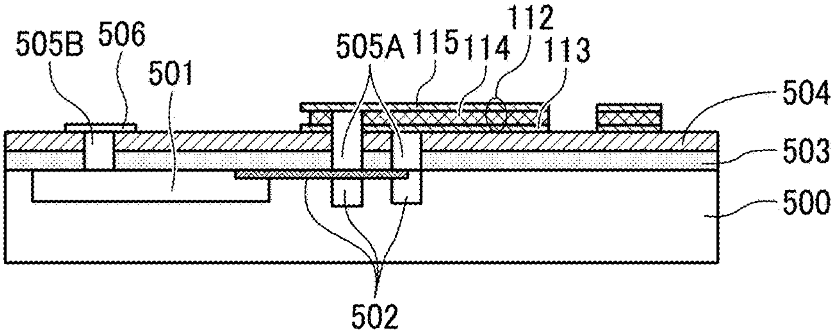

Then, as illustrated in FIG. 9F, the masking for the upper electrode 115 and wiring is performed on the piezoelectric film 114 to form a film of electrode material. Thereafter, the mask is removed to form the upper electrode 115. At the same time, conduction between the upper electrode 115 and one of the pair of contact portions 505A is ensured.

Figure 9G:
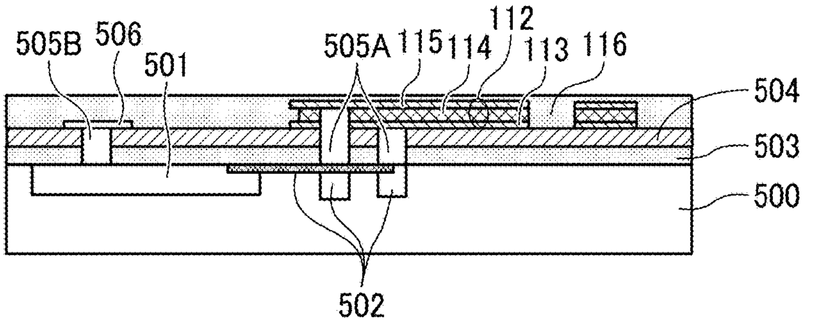

Next, as illustrated in FIG. 9G, the protective film 116 is formed as a layer on the outer entire face of the vibration layer 504 including the surfaces of the piezoelectric element 112 and the electrode pad 506.

Figure 9H:
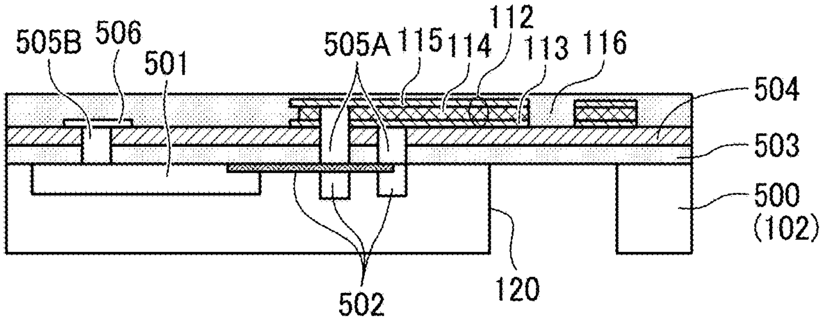

Subsequently, as illustrated in FIG. 9H, the photolithography and etching are performed from an inner side of the silicon substrate 500 to form the liquid chamber 120. Thus, the silicon substrate 500 serves as the liquid chamber former 102. At this time, the insulation layer 503 serves as an etch stop.

Figure 9I:
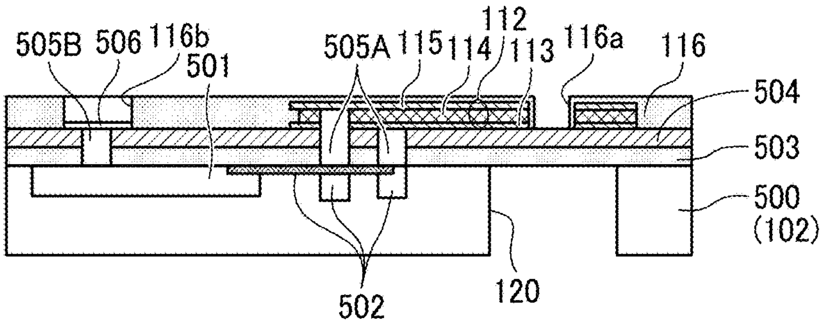

Next, as illustrated in FIG. 9I, the photolithography is performed on the protective film 116 to form an opening 116*a* as a part of the nozzle 110 and to form a groove 116*b* in a portion corresponding to the electrode pad 506.

Figure 9J:
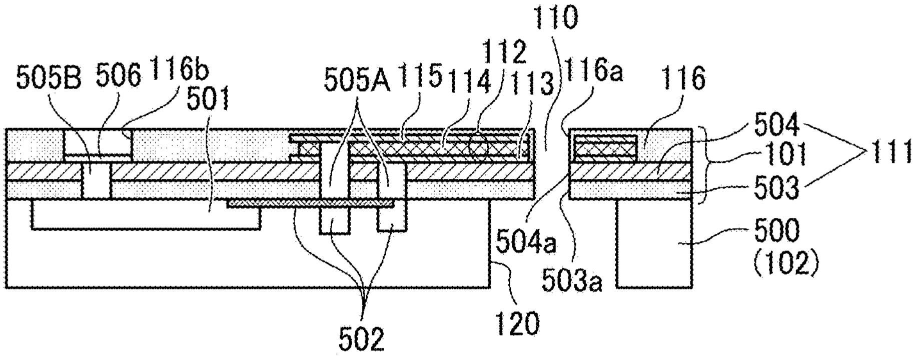

Subsequently, as illustrated in FIG. 9J, the vibration layer 504 is etched with the protective film 116 as a mask to form an opening 504*a* as a part of the nozzle 110. Similarly, the insulation layer 503 is etched to form an opening 503*a* as a part of the nozzle 110. At this time, the electrode pad 506 is protected by a resist. Thus, the electrode pad 506 is prevented from being etched.

The liquid discharge head illustrated in FIG. 9J is assembled with components such as a separately manufactured common liquid chamber substrate. Finally, the liquid discharge head is completed.

Now, a description is given of a specific example of a method for manufacturing the liquid discharge head according to the first embodiment of the present disclosure.

In the manufacturing process described with reference to FIGS. 9A to 9J, the protective film 116 is a bromocholine bromide (BCB) layer having a thickness of 0.5 μm. The piezoelectric film 114 is an aluminum nitride (AlN) film having a thickness of 2 μm. The vibration layer 504 is a silicon (Si) layer having a thickness of 2 μm. Between the vibration layer 504 and the lower electrode 113, two silicon monoxide (SiO) layers are formed as the insulation layer 503 having a thickness of 1 μm and a stress adjusting function.

Since the two SiO layers have compressive stress with respect to the vibration layer 504 as the Si layer, the surrounding area 130 of the nozzle 110 is warped in the direction opposite to the liquid discharge direction, in other words, toward the liquid chamber 120, after the process is completed.

Accordingly, the wiper 201 is prevented from contacting the nozzle 110 during the wiping operation, or the wiper 201 contacts the nozzle 110 with decreased pressure during the wiping operation. As a result, the repetitive wiping load on the liquid repellent film 117 is reduced, resulting in an extension of the lifespan of the liquid repellent film 117.

On the other hand, for the nozzle 110 in which a normal meniscus is not formed, the first voltage is applied in a direction in which the piezoelectric element 112 contracts so that the wiper 201 wipes the discharge face 118 adjacent to the nozzle 110 to reliably remove a contaminant from the discharge face 118. As a result, as described above, the surrounding area 130 of the nozzle 110 is warped in the liquid discharge direction, allowing the wiper 201 to reliably contact the surrounding area 130 and remove the contaminant from the surrounding area 130 at the time of wiping. Thus, the normal meniscus is formed with a small number of times of wiping.

In the first embodiment, a layer structure is employed in which the surrounding area 130 of the nozzle 110 is warped in the direction opposite to the liquid discharge direction when no voltage is applied to the piezoelectric element 112. On the other hand, such a layer structure may be employed in which, by controlling the film thickness and residual stress of the layer structure at the portion of the nozzle 110 of the nozzle member 101, the surrounding area 130 of the nozzle 110 is warped in the direction opposite to the liquid discharge direction when no voltage is applied to the piezoelectric element 112, as in the second embodiment.

Figure 10:
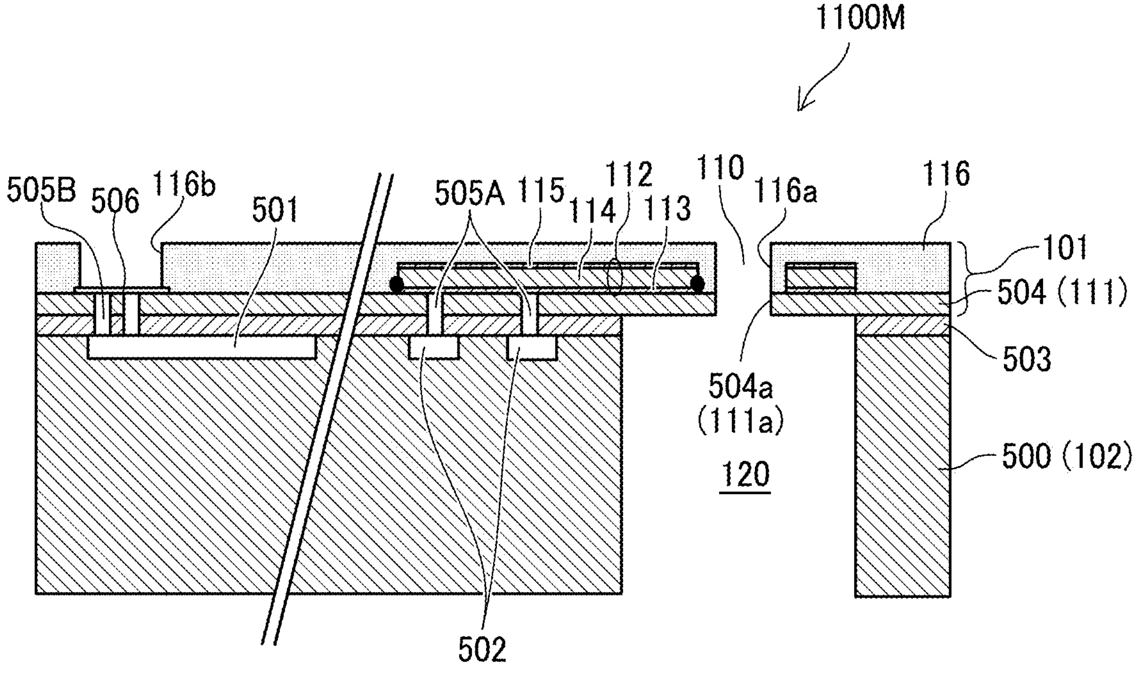
FIG. 10 is a cross-sectional view of a liquid discharge head according to a modification of the first comparative example illustrated in FIG. 8 in which a surrounding area of a nozzle is not warped.

Referring now to FIG. 10, a description is given of a liquid discharge head according to a modification of the first comparative example in which the surrounding area of the nozzle is not warped.

FIG. 10 is a cross-sectional view of a liquid discharge head according to a modification of the first comparative example in which the surrounding area of the nozzle is not warped.

A liquid discharge head 1100M according to the present modification includes silicon-on-insulator (SOI) substrates. Specifically, in the manufacturing process of the liquid discharge head described with reference to FIGS. 9A to 9J, portions corresponding to the silicon substrate 500, the insulation layer 503, and the vibration layer 504 are formed of the SOI substrates. Specifically, the silicon substrate 500 is made of silicon (Si). The insulation layer 503 is made of silicon dioxide ($SiO_2$). The vibration layer 504 is made of silicon (Si).

Using the SOI substrates as the substrates that form the liquid chamber 120 together with the drive circuit 501 reduces the stray capacitance and the leakage current generated in the drive circuit 501 and attains high-speed printing processing with the liquid discharge head 100 and power saving while enhancing the pressure resistance and reliability of the drive circuit 501.

With continued reference to FIG. 10, a description is given of a specific example and a comparative example of the third embodiment.

As described above, when the discharge operation is repeatedly performed, stresses are repeatedly applied to the joint between the sidewall face 120*a* of the liquid chamber 120 and the laminar member 111. When a voltage is applied to the piezoelectric element 112, the surrounding area 130 of the nozzle 110 is displaced in a direction in which the angle θ increases at the joint.

When the angle θ exceeds 90°, the tensile stress is applied to the laminar member 111 at the joint. Repeated application of the tensile stress may cause cracks in the laminar member 111 and shorten the lifespan of the laminar member 111.

The liquid discharge head 1100 of the first comparative example as illustrated in FIG. 8 includes the protective film 116 as a BCB layer having a thickness of 0.5 μm, the piezoelectric element 112 made of AlN and having a thickness of 2 μm, and the laminar member 111 made of Si and having a thickness of 2 μm.

When a rectangular wave of ±150 V was applied to the liquid discharge head 1100 of the first comparative example, the liquid discharge head 1100 malfunctioned due to cracks in the laminar member 111 after the input of a 1E9 pulse.

According to a first example of the third embodiment, the protective film 116 is a BCB layer having a thickness of 0.5 μm. The piezoelectric element 112 is made of AlN and has a thickness of 2 μm. The laminar member 111 is made of Si and has a thickness of 2 μm. Two SiO layers having a thickness of 1 μm are interposed between the laminar member 111 and the lower electrode 113.

As a result, as described in the third embodiment, the angle θ is less than 90° between the sidewall face 120*a* of the liquid chamber 120 and the face 101*a* of the nozzle member 101 facing the liquid chamber 120.

When a rectangular wave of ±150V was applied to the liquid discharge head 100B of the first example, the liquid discharge head 100B malfunctioned due to cracks in the laminar member 111 after the input of a 3E10 pulse. The comparison of the first example and the first comparative example clarifies that the lifespan of the liquid discharge head 100B of the first example is longer than the lifespan of the liquid discharge head 1100 of the first comparative example.

Figure 11:
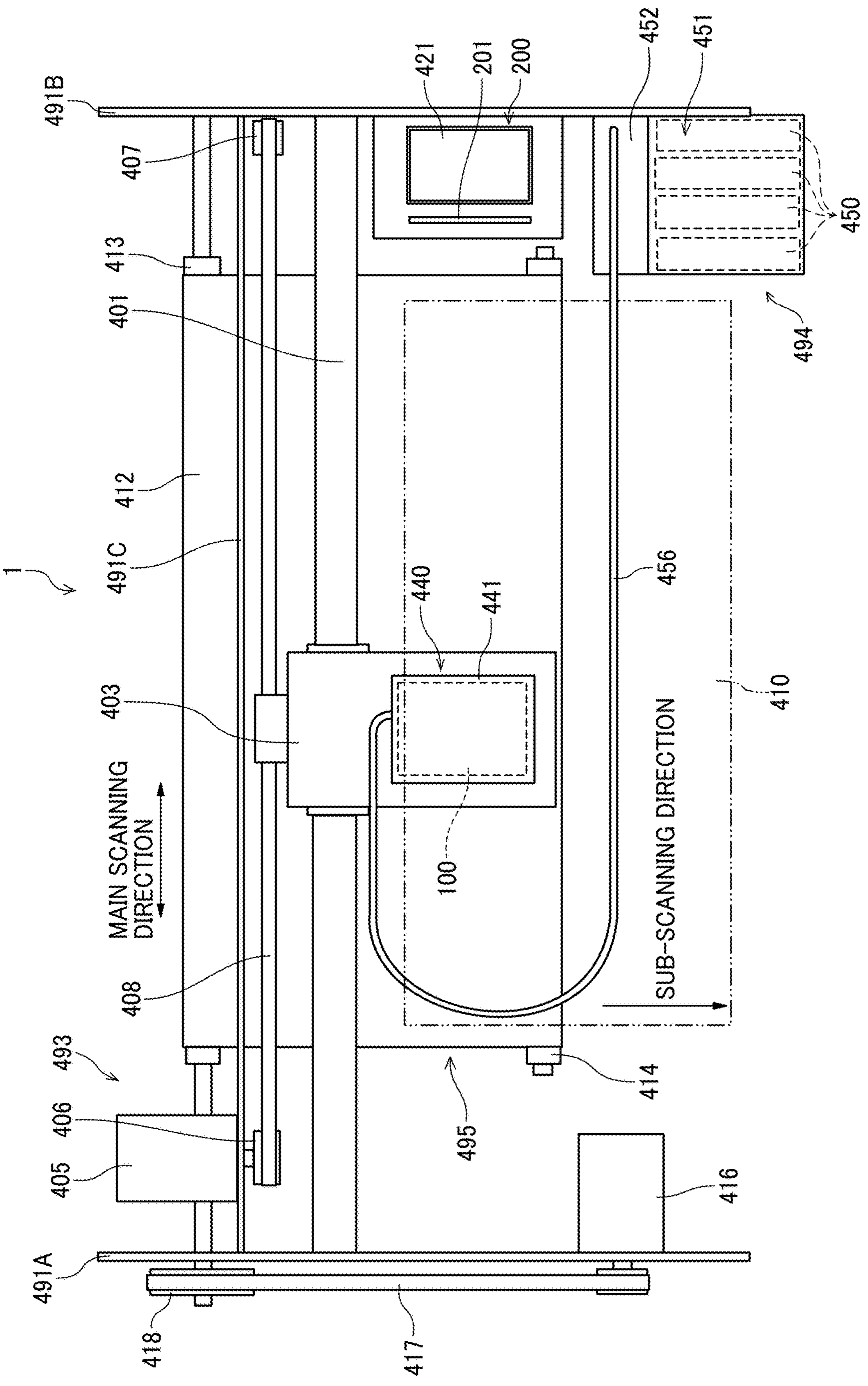
FIG. 11 is a schematic plan view of a liquid discharge apparatus according to an embodiment of the present disclosure.
Figure 12:
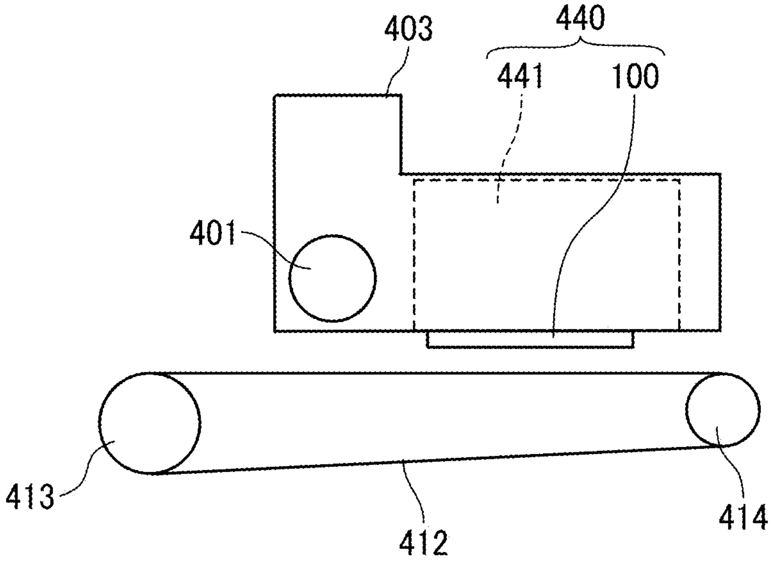
FIG. 12 is a partial side view of the liquid discharge apparatus illustrated in FIG. 11.

Referring now to FIGS. 11 and 12, a description is given of a liquid discharge apparatus according to an embodiment of the present disclosure.

FIG. 11 is a plan view of a liquid discharge apparatus according to an embodiment of the present disclosure. FIG. 12 is a partial side view of the liquid discharge apparatus illustrated in FIG. 11.

The liquid discharge apparatus 1, as an apparatus that discharges liquid, is a serial-type apparatus that includes a main-scanning moving assembly 493 to reciprocally move a carriage 403 in a main scanning direction. The main-scanning moving assembly 493 includes, e.g., a guide 401, a main-scanning motor 405, and a timing belt 408. The guide 401 is bridged between a left side plate 491A and a right side plate 491B to hold the carriage 403 such that the carriage 403 can move. The main-scanning motor 405 reciprocally moves the carriage 403 in the main scanning direction via the timing belt 408 bridged between a driving pulley 406 and a driven pulley 407.

The carriage 403 carries a liquid discharge device 440 in which a head tank 441 and the liquid discharge head 100 according to the embodiments described above are integrated into a single unit. The liquid discharge head 100 of the liquid discharge device 440 discharges liquid for each color, e.g., yellow (Y), cyan (C), magenta (M), and black (K). The liquid discharge head 100 includes a nozzle array including multiple nozzles in a sub-scanning direction orthogonal to the main scanning direction. The nozzle array is disposed to discharge the liquid downward.

The liquid discharge apparatus 1 further includes a supply assembly 494 to supply liquids stored outside the liquid discharge head 100 to the liquid discharge head 100. The supply assembly 494 supplies the liquids stored in liquid cartridges 450 to the head tank 441.

The supply assembly 494 includes, e.g., a cartridge holder 451, a tube 456, and a liquid feeder 452. The liquid cartridges 450 are attached to the cartridge holder 451 that serves as a filler. The liquid feeder 452 includes a liquid feed pump. Specifically, the liquid cartridges 450 are removably attached to the cartridge holder 451. The liquid feeder 452 feeds the liquids from the liquid cartridges 450 to the head tank 441 via the tube 456.

The liquid discharge apparatus 1 further includes a conveyance assembly 495 to convey a sheet 410. The conveyance assembly 495 includes a conveyance belt 412 that serves as a conveyor and a sub-scanning motor 416 to drive the conveyance belt 412.

The conveyance belt 412 attracts the sheet 410 and conveys the sheet 410 at a position where the conveyance belt 412 faces the liquid discharge head 100. The conveyance belt 412 is an endless belt entrained around a conveyance roller 413 and a tension roller 414. For example, the sheet 410 is attracted to the conveyance belt 412 electrostatically or by air suction.

The conveyance belt 412 rotates in the sub-scanning direction as the conveyance roller 413 is rotated by the sub-scanning motor 416 via a timing belt 417 and a timing pulley 418.

The maintenance assembly 200 is disposed beside the conveyance belt 412 in the main scanning direction in which the carriage 403 moves. The maintenance assembly 200 maintains and recovers the liquid discharge head 100.

The maintenance assembly 200 includes, e.g., a cap 421 and the wiper 201. The cap 421 caps the discharge face (or nozzle face) 118 of the liquid discharge head 100. The wiper 201 wipes the discharge face 118.

The main-scanning moving assembly 493, the supply assembly 494, the maintenance assembly 200, and the conveyance assembly 495 are attached to a housing that includes the left side plate 491A, the right side plate 491B, and a rear plate 491C.

In the liquid discharge apparatus 1 thus configured, the sheet 410 is fed onto the conveyance belt 412 and attracted to the conveyance belt 412. The sheet 410 thus attracted to the conveyance belt 412 is conveyed in the sub-scanning direction as the conveyance belt 412 rotates.

The liquid discharge head 100 is driven in response to image signals while the carriage 403 moves in the main scanning direction, to discharge liquid to the sheet 410 stopped and form an image on the sheet 410.

The wiper 201 of the maintenance assembly 200 wipes and cleans the discharge face 118 of the liquid discharge head 100. At this time, the warp of the surrounding area 130 of the nozzle 110 is controlled as described in the first to third embodiments as necessary.

An apparatus that uses a liquid discharge head performs a wiping operation of wiping a discharge face with a wiper to clean the discharge face. According to one aspect of the present disclosure, the discharge face is wiped with an enhanced cleaning efficiency and the damage to the discharge face is reduced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus, comprising:

a liquid discharge head that includes a nozzle member, the nozzle member including:

a nozzle configured to discharge liquid; a deformable laminar member having an opening forming the nozzle; and an electromechanical transducer disposed around the opening, the nozzle member being configured to be warped in a direction opposite to a liquid discharge direction with respect to a discharge-side plane of the nozzle member in a surrounding area of the nozzle when no voltage is applied to the electromechanical transducer;

a wiper configured to wipe a discharge face of the liquid discharge head; and a voltage applier configured to apply a voltage to the electromechanical transducer of the liquid discharge head and warp the surrounding area of the nozzle in the liquid discharge direction when the wiper wipes the discharge face.

2. The liquid discharge apparatus according to claim 1, wherein the surrounding area of the nozzle is an entire area of a portion of the nozzle member facing a liquid chamber communicated with the nozzle, and wherein the nozzle member has a face facing the liquid chamber, and the face of the nozzle member is inclined at an angle less than 90° with respect to a sidewall face of the liquid chamber.

3. A liquid discharge apparatus comprising:

a liquid discharge head, the liquid discharge head including a nozzle member, the nozzle member including a nozzle configured to discharge liquid; a deformable laminar member having an opening forming the nozzle; and an electromechanical transducer disposed around the opening, the nozzle member being configured to be warped in a liquid discharge direction with respect to a discharge side plane of the nozzle member in a surrounding area of the nozzle when no voltage is applied to the electromechanical transducer;

a wiper configured to wipe a discharge face of the liquid discharge head; and a voltage applier configured to apply a voltage to the electromechanical transducer of the liquid discharge head and warp the surrounding area of the nozzle in a direction opposite to the liquid discharge direction when the wiper wipes the discharge face.

4. The liquid discharge apparatus according to claim 3, wherein the surrounding area of the nozzle is a part around the nozzle of a portion of the nozzle member facing a liquid chamber communicated with the nozzle.

* * * * *